(No Model.) 7 Sheets—Sheet 4.
E. W. AVERY.
BAND SAW MILL.
No. 381,977. Patented May 1, 1888.
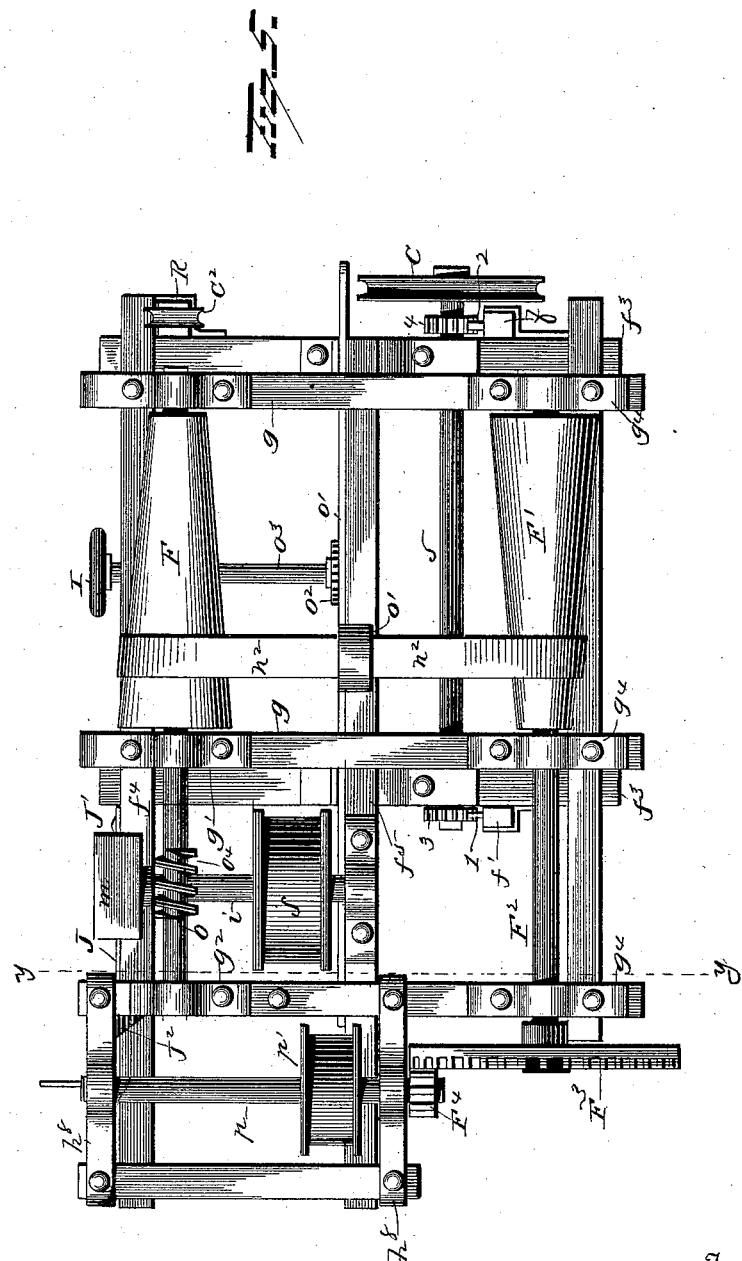
Witnesses
P. J. Nottingham
G. F. Downing
Inventor
Earl W. Avery
By his Attorney
H. A. Seymour (No Model.) 7 Sheets—Sheet 5.
E. W. AVERY.
BAND SAW MILL.
No. 381,977. Patented May 1, 1888.
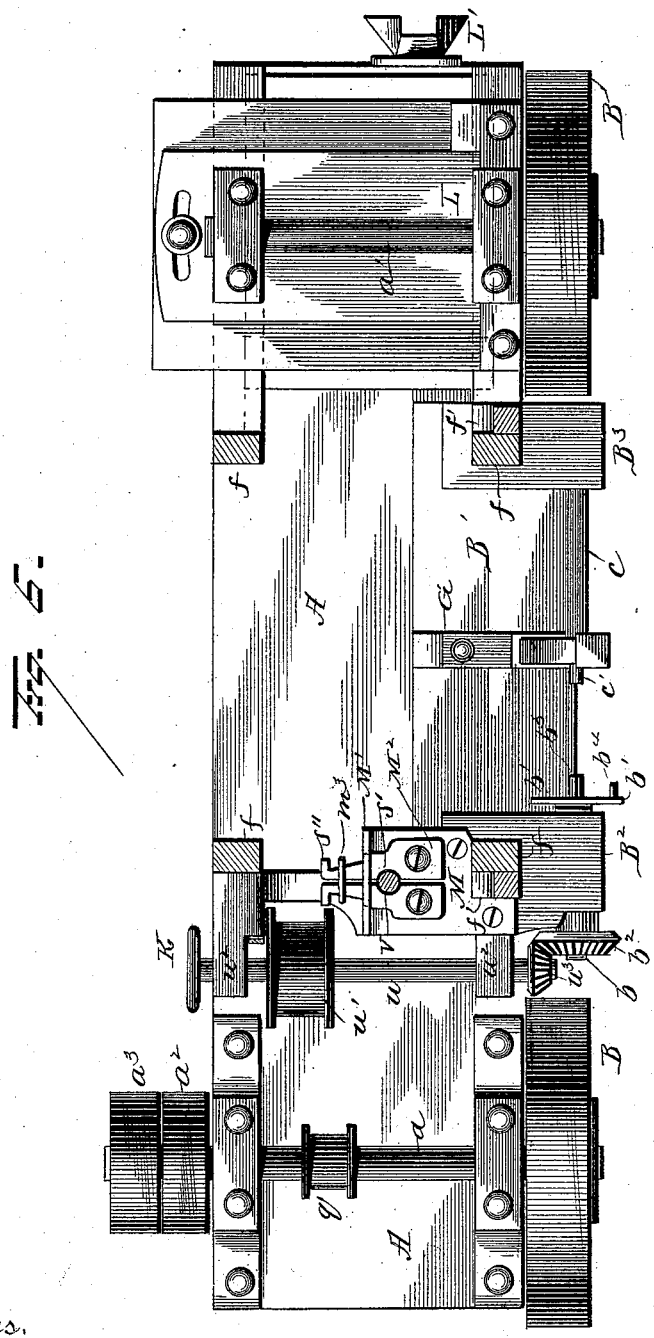
Witnesses
E. Nottingham
G. F. Downing
Inventor
Earl W. Avery
By his Attorney
H. A. Seymour

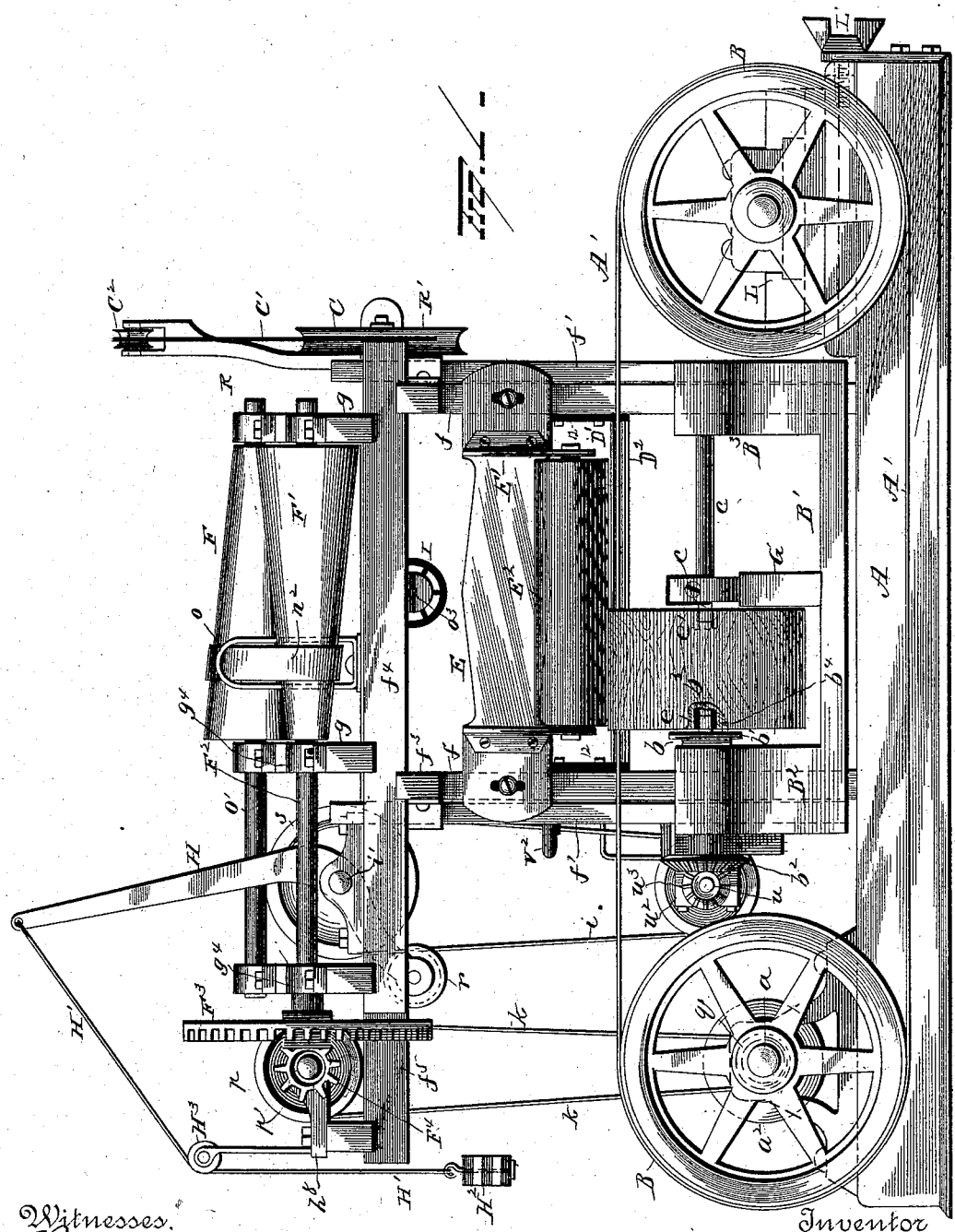

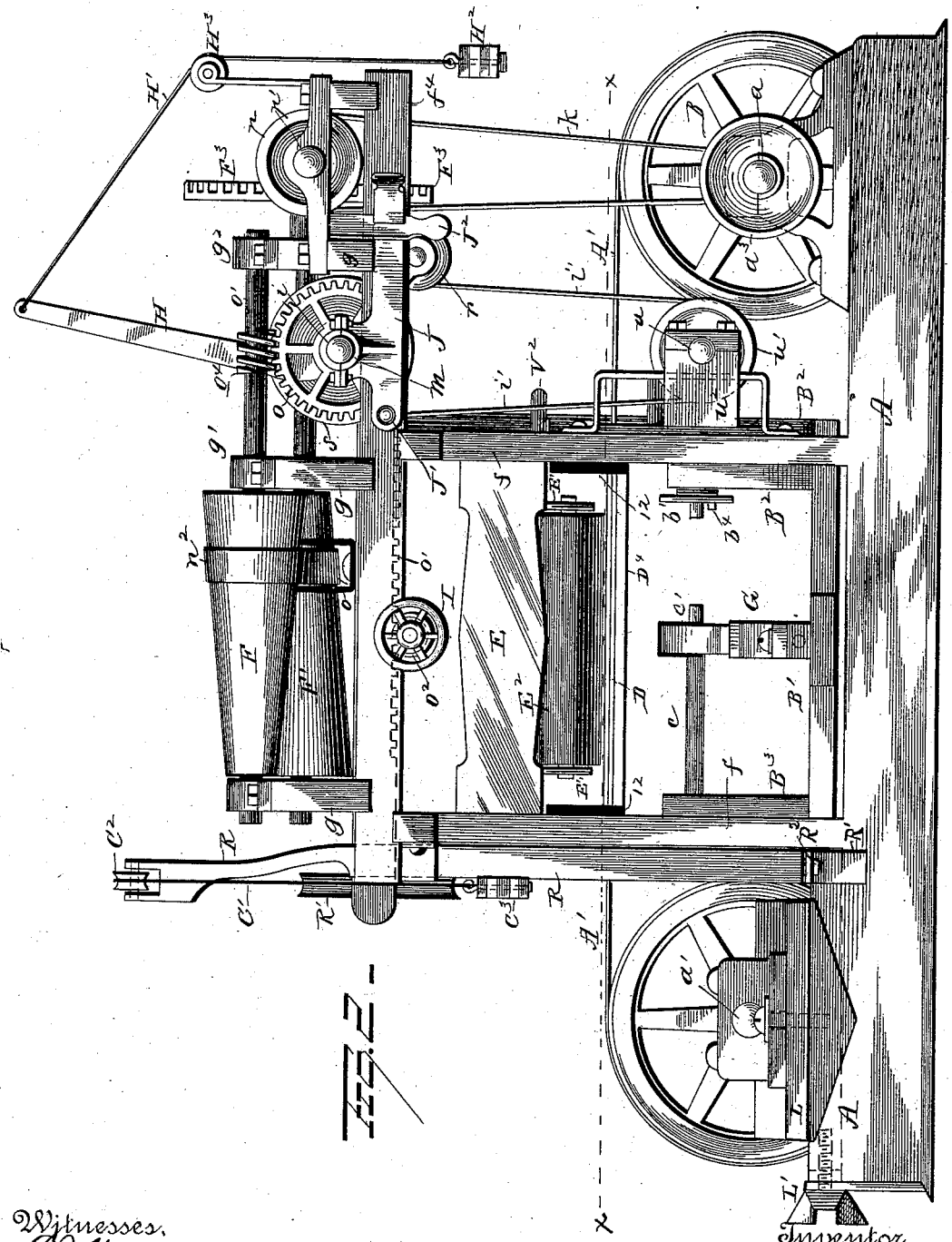

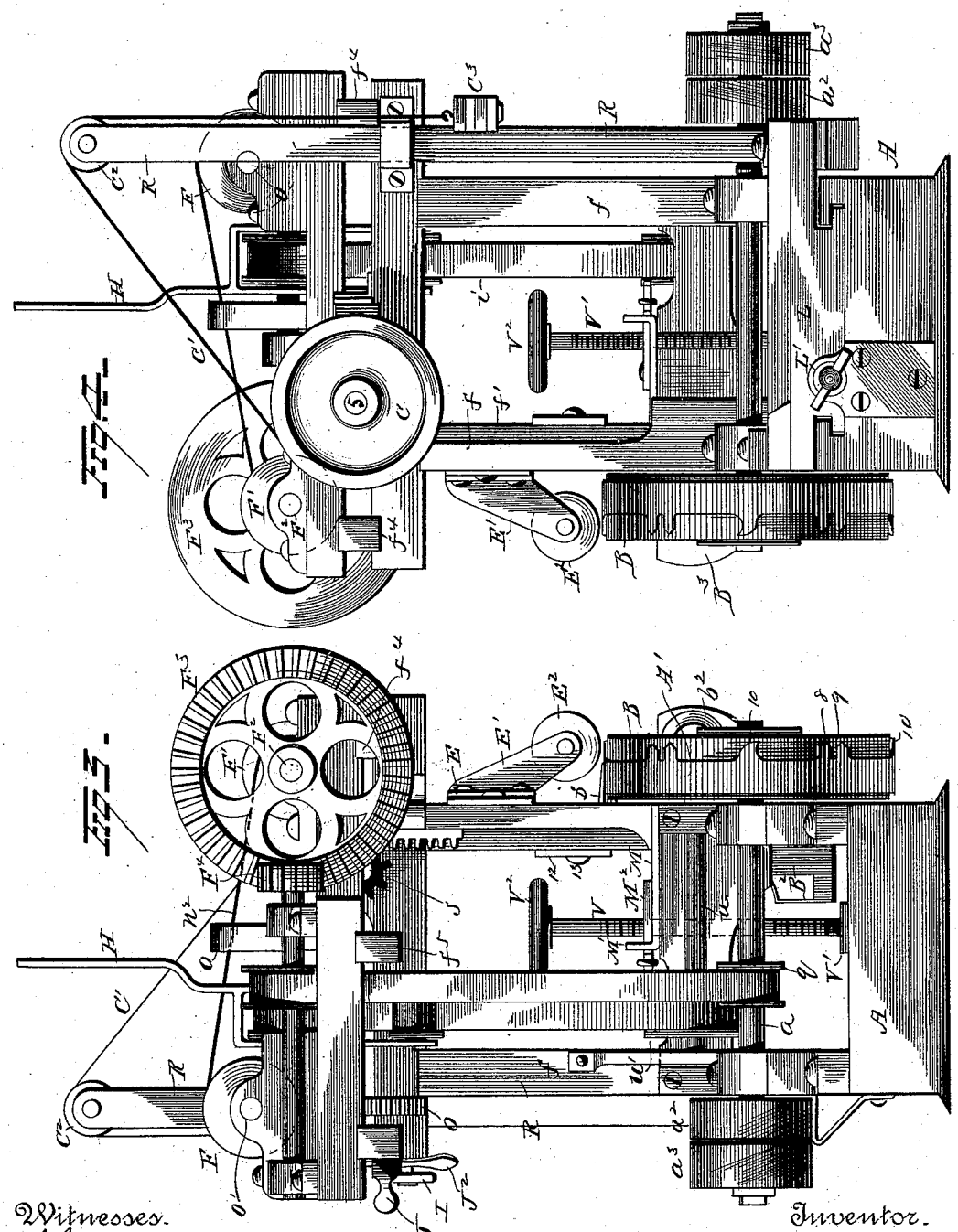

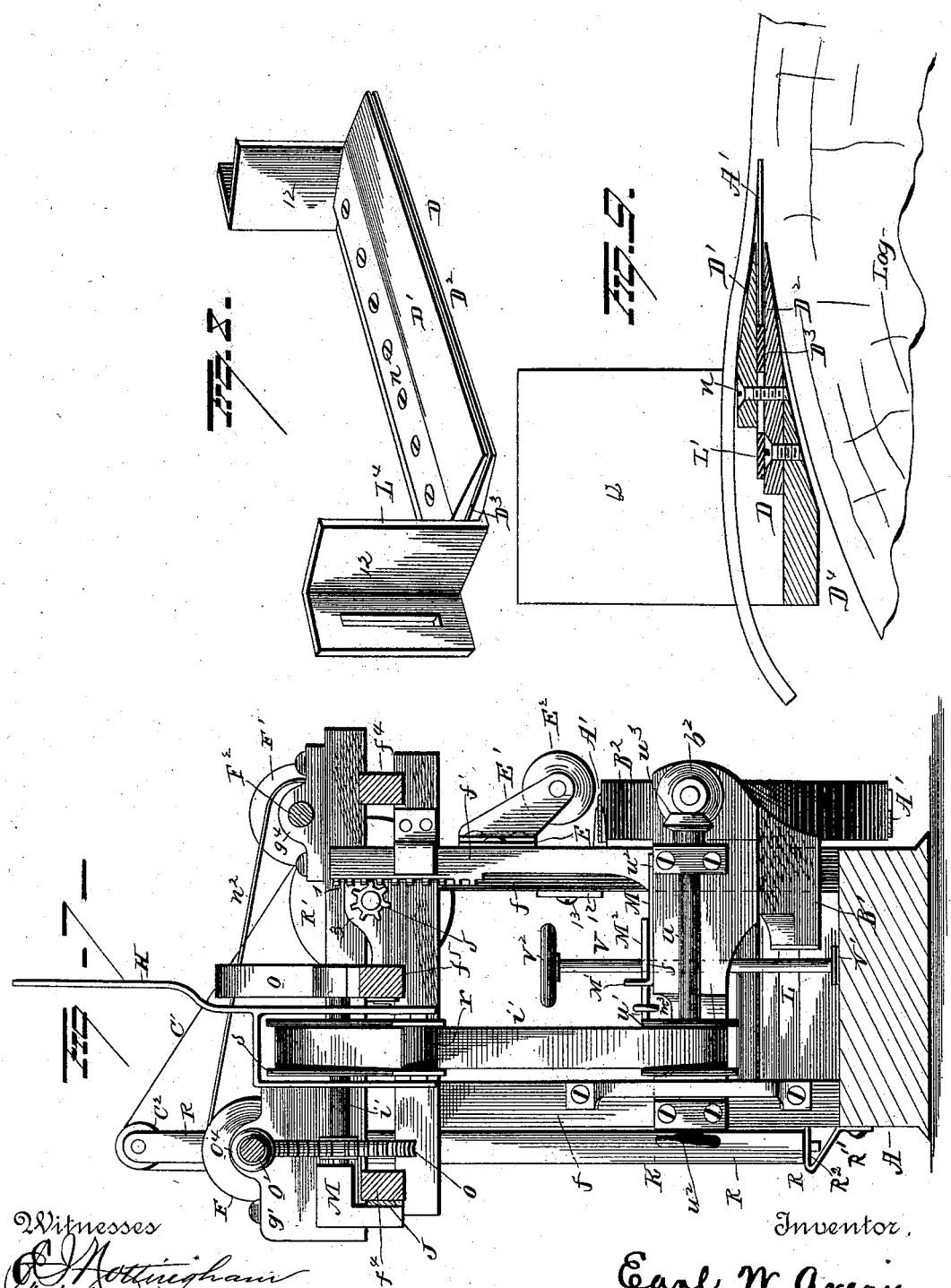

(No Model.) 7 Sheets—Sheet 7.
E. W. AVERY.
BAND SAW MILL.
No. 381,977. Patented May 1, 1888.
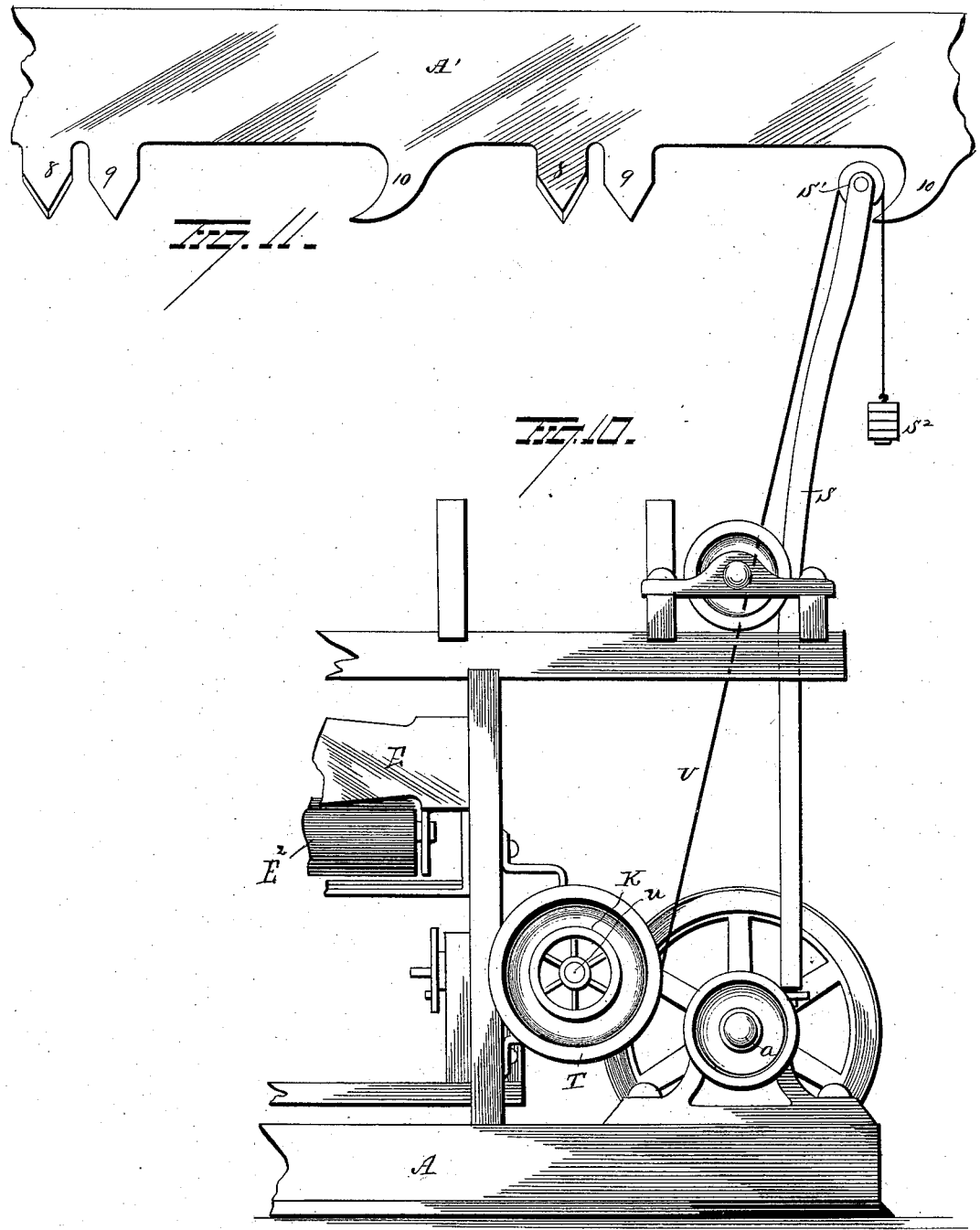

UNITED STATES PATENT OFFICE.

EARL W. AVERY, OF LOWELL, MICHIGAN.

BAND-SAW MILL.

SPECIFICATION forming part of Letters Patent No. 381,977, dated May 1, 1888.

Application filed September 20, 1887. Serial No. 250,207. (No model.)

*To all whom it may concern:*

Be it known that I, EARL W. AVERY, of Lowell, in the county of Kent and State of Michigan, have invented certain new and useful Improvements in Band-Saw Mills; and I do hereby declare the following to be a full, clear, and exact description of the invention, such as will enable others skilled in the art to which it appertains to make and use the same.

My invention relates to an improvement in band-saw mills.

The primary object of my present invention is to construct a saw-mill by which a log cut to a proper length may be held and rotated, in contact with an endless-band saw, so as to cut the log into a continuous board, the saw cutting lengthwise of the log, or in a plane parallel to the axial center on which said log rotates.

A further object is to afford a simultaneous vertical and rotary feed to a log that is to be cut as a scroll, so that the round stick of timber may be converted into a continuous board by cutting from the outer surface around the log the cross-section of the cut log, representing a volute kerf from the outer surface of the log toward the center.

A further object is to furnish a band-saw with a supporting-guide that is adjustable as to height, and also in regard to the rear edges of the saw-blade.

A further object is to provide a band-saw mill that is adapted to cut a log into a continuous scroll from the outside surface toward the center, with a means of regulating the thickness of the cut board to cut it regularly at any desired gage.

A further object is to furnish a means for the truing up of the rough log preparatory to the use of a continuous feed motion in connection with the band-saw.

An evident design of this invention is to afford a compact, practical, and readily-operating band-saw mill that may be utilized to cut rough logs into continuous boards of any desired thickness, the width of the board being represented by the length of the cylindrical billet or log that is being cut by the saw.

With these objects in view my invention consists in certain features of construction and combinations of parts that will be hereinafter described, and pointed out in the claims.

Referring to the drawings, Figure 1 is a front elevation of the saw-mill. Fig. 2 is a rear elevation of the mill mechanism. Fig. 3 represents an end elevation of the saw-mill, showing the driving-shaft and feed mechanism. Fig. 4 is a view in elevation of the opposite end of the mill from that shown in Fig. 3. Fig. 5 is a top plan view of the mill machinery. Fig. 6 is a plan view of the mill, with the top gearing and frame-work removed, on a line, $x\ x$, (see Fig. 2,) just below the gage-roller that regulates the thickness of the board as it is being cut. Fig. 7 is an elevation of the saw-mill on line $y\ y$, Fig. 5. Fig. 8 is an enlarged and detached view of the adjustable saw-guide and its bracket-plate. Fig. 9 is an end view of the saw-guide, its bracket-plate, and the saw-blade in position. Fig. 10 is a rear elevation of the mill machinery, showing a modified simple method of affording a rotary feed motion to the log while it is being cut. Fig. 11 is an enlarged detached view of the saw-blade, showing form of its teeth.

A represents the base-frame of the mill. It is of proper length and width to accommodate the machinery sustained by it.

The band-saw A' is mounted upon driving-pulleys B, which are affixed to the ends of the shafts $a\ a'$, that revolve in boxes formed in brackets mounted on the frame A. The shaft $a$ is driven by a pulley, $a^2$, which is secured to it near its rear end, and a loose pulley, $a^3$, is placed adjacent to it to allow the driving-belt to be shifted from one to the other to start or stop motion, as may be required. The shaft $a'$ is placed in bracket-boxes that are affixed to the sliding carriage L, which is operated by the adjusting-screw L' to strain the band-saw A' and give it required tension.

The pulleys B are each covered on their peripheral surface with a slightly-yielding material—such as vulcanized gum or leather—to insure a proper frictional contact therewith of the saw to drive it without danger of rupturing the blade.

Between the pulleys B B a log-carriage is placed upon the frame A. This carriage consists of a base-plate, B', at each end of which are mounted the head and tail stocks $B^2$ $B^3$. The head-stock $B^2$ is provided with a mandrel, $b$, on which is secured the chuck-plate $b'$ at the inner end, the other end of the mandrel having a bevel-pinion, $b^2$, affixed upon it. A spindle, $c$, is located in boxes of the tail-stock $B^3$, and an intermediate bracket, G, is adjustably secured in position upon the base-plate $B'$ of the log-carriage, so that it can be moved toward the tail-stock to accommodate logs of varying lengths, or may be removed entirely if a log of extra length is to be operated upon. The spindle $c$, which is made to lie in the same plane with the mandrel $b$ to give support to the end of a log that is adapted to rotate upon its end $c'$, may be made adjustable as to length, or several of these metallic spindles may be provided to suit logs of different lengths. The mandrel $b$ terminates in a point, $b^3$, which projects beyond the chuck-plate $b'$ to enter a central hole in the socket-piece $e$, this short tubular flanged socket-piece being provided to afford a reliable center support for the log, a similar socket-piece, $e'$, being inserted in the other end of the log, this latter-named piece $e'$ having revoluble engagement with the free end of the spindle $c$. From the face of the chuck-plate $b'$ a projecting stud, $b^4$, enters a hole in the end of the log to drive it when the chuck-plate is revolved.

Immediately in the rear of the head and tail stocks $B^2$ $B^3$ a rectangular frame is erected to give support to the feeding mechanism and other important details of construction. This frame consists of the front uprights, $f$, rear uprights, $f^2$, top end strips, $f^3$, two side timbers, $f^4$, and a middle stringer-piece, $f^5$, which are firmly secured to produce a stable frame.

Upon the outside edges of the front frame-standard, $f$, the guide-bars $f'$ are slidingly supported. These bars are fixed by their lower ends to the head and tail stocks $B^2$ $B^3$ of the log-carriage, and have toothed racks 1 2 secured to project beyond their rear surface and engage two pinions, 3 4, which are mounted upon the shaft 5, this shaft being supported in boxes that are attached to the top edges of the end strips, $f^3$, in proper position to permit the meshing contact of the racks and pinions, as stated.

Upon the outer end of the shaft 5 the grooved pulley C is mounted and secured. To this pulley a rope or chain, C', is attached by one of its ends, the other end passing over the loose grooved pulley $C^2$, which is pivoted to rotate in the crotched upper end of the standard R, this standard being supported upright by a step, $R^2$, and loop R', that is secured to the side of the frame. It is evident that if there is a weight, $C^3$, attached to the free end of the rope or chain C', and this weight is heavier than the log-carriage with a log in position upon it, the action of gravity will elevate the log-carriage until this upward movement is checked.

Upon the front face of the upright frame-pieces $f\,f$ the horizontal bracket-plate E is secured. This bracket is slotted at each end to afford a means of vertical adjustment upon the clamping-bolts which hold it in place upon the upright timbers or frame-pieces $f\,f$.

The outwardly and downwardly projecting ears E' are rigidly attached to the front face of the bracket-plate E and are designed to give support to the gaging-roller $E^2$, this roller having a central shaft that projects beyond its ends to enter boxes of the ears E' and revolve in them.

The position of the bracket-plate E is such that the roller $E^2$ will be supported with its true cylindrical surface parallel to the top surface of the band-saw A' and have its lower face adjusted such a proper distance above the teeth of the band-saw as to allow the saw to cut a board lengthwise of the log, the thickness of this board being regulated by the relative position of the gaging-roller $E^2$, as it is apparent that the height of this roller above the cutting-edge of the blade A' will control the depth of the cut and consequent thickness of the board.

It is necessary for the proper operation of the saw that it should be provided with teeth that will not drag or cut roughly, as the material being cut with the grain, if acted upon by a saw of ordinary construction, will tear out slivers or cut roughly if set to give a clearance-kerf; and to avoid the clamping upon the saw-blade of the cut board which is sawed around the log I have made provision of a guide to the saw that also spreads the sawed slit and prevents the saw from heating or becoming wood-bound in its kerf.

The saw-guide D is composed of a top plate, D', and bottom plate, $D^2$, both beveled to have nearly sharp edges that in use are adjacent to the bases of the saw-teeth. The beveled plates D' $D^2$ are held apart a proper distance to allow a neat sliding fit of their inner flat surfaces upon the blade of the saw A' A'. The spacing-plate $D^3$ is secured in place between the rear portions of the wedge-shaped guide-plates D' $D^2$ by the set bolts or screws $n$, which are inserted through holes in the top plate, D', and into tapped or threaded holes in the bottom plate, $D^2$, the spacing-plate $D^3$ being slotted at proper intervals on its edge to allow the set-screws $n$ to enter these slots and the other remaining portions of the plate to extend toward the back edge of the saw A'. By this method of construction it will be seen that the saw-blade will be given a support at the base of its teeth, and as the guide D is made of sufficient length to reach from one upright $f$ to the opposite similar upright that supports the log-carriage, it follows that the blade A' will be held to cut true, and all twisting or buckling of the same will be obviated.

By making the spacing-plate $D^3$ adjustable the working-space between the guide-plates D' $D^2$ may be increased or diminished to suit the thickness of the saw-blade by the introduction of liners or other equivalent mechanical expedient, so that a free but close adjustment of these pieces with regard to the saw-blade may at all times be maintained.

It is essential that the saw-guide D be susceptible of vertical close adjustment with regard to the saw-blade A' to prevent it from being cramped when strained by the adjusting-table L and its screw L'. To effect such an adjustment I provide an adjustable guide-table, $D^4$, upon which is fastened the lower guide-plate, $D^2$, this latter-named piece projecting rearward to properly rest upon the top surface of the forward portion of the table $D^4$. The lower surface of the table $D^4$, beneath the guide-plate $D^2$, is sloped or beveled to conform to the inclined surface or wedge form of this guide-plate, the rearward portion of the table having parallel top and bottom surfaces.

Upon each end of the guide supporting table $D^4$ the vertical flanges 12 are integrally formed, these being adapted by their L shape to bear upon the sides of the upright frame-pieces $f$, the portions that bear upon the rear sides of these upright timbers being slotted to receive the set-bolts 13, which secure the guide-table $D^4$ to them.

To cut a continuous board from a log that is placed between the head and tail stocks of the log-carriage it is necessary that an assured or positive rotary motion be given the supported log that will move it against the running toothed edge of the saw at a proper speed, and to do this I have provided two feed motions. The preferred form of construction will be first described. The head-stock B' of the log-carriage is extended rearwardly, and upon the side of same nearest the driving-shaft $a$ the feed-shaft $u$ is loosely secured in bracket-boxes $u^2$, a bevel-pinion, $u^3$, being placed upon the end of the shaft $u$ in meshed contact with the bevel-pinion $b^2$, the latter-named pinion being secured upon the end of the mandrel $b$, as has been previously stated. Upon the shaft $u$, between the bracket-boxes $u^2$, a flanged pulley, $u'$, is mounted. This pulley is connected to a pulley, $s$, above it by the belt $i$. The pulley $s$ just mentioned is affixed upon the shaft $i'$ to line with pulley $u'$, and on this shaft $i'$ is also placed a worm gear-wheel, O, that meshes with a worm-threaded hub, $O^4$, that is located upon the shaft O'. This shaft O', being supported to rotate in the boxes $g'$ $g^2$, has on its extension a cone-pulley, F, mounted and fixed securely.

Upon the parallel transverse timbers $g$ $g$, which support the boxes of the cone-pulley F, and near the front ends of these timbers, proper boxes $g^4$ $g^4$ are affixed, which support a shaft, $F^2$, this shaft having the cone-pulley F' placed upon it in a line with the mating cone-pulley F, these pulleys being arranged, as shown, so that a belt, $n^2$, if shifted from end to end of the pulleys, will be equally stretched to transmit motion.

The shaft $F^2$ is extended to receive a crown-wheel, $F^3$, said wheel being secured to the end of the shaft that extends outside of the box $g^4$, and is thus given a positive mesh with the pinion $F^4$, which is fixed upon the end of the shaft $p$, that is revolubly held in place by the boxes $h^3$ in position immediately above the driving-shaft $a$, so that a flanged pulley, $p'$, that is secured upon the shaft $p$, will line with a similar flanged pulley, $q$, this latter pulley being mounted upon the driving-shaft $a$. Upon the pulleys $p'$ $q$ a belt, $k$, is placed to transmit motion from the driving shaft $a$ through the train of wheels and pulleys just described, and it will be noticed that by means of the pair of cone-pulleys F F' the speed may be increased or diminished, and the rotary feed motion that is communicated through them to the log being sawed thus regulated. The belt $n^2$, placed upon the cone-pulleys F F', is moved laterally upon these pulleys and held at any desired point by the belt-shipper $o$, which consists of a loop having parallel sides that project upwardly from a horizontal toothed rack, $o'$. These sides of the shipper $o$, engaging the edges of the belt $n^2$, cause it to move to any desired point, and as the rack $o'$ is in meshed contact with the pinion $o^2$, fixed upon the end of the shaft $o^3$, this shaft having a hand-wheel, I, on its outer end, it is evident that the rack $o'$ may be moved endwise, and thus ship the belt $n^2$ to any desired point upon the cone-pulleys, and retain it there until changed by the operator of the saw-mill.

A belt-tightening device consisting of an idler-pulley, $r$, mounted on a frame that is pivoted to swing upon the shaft $i'$, is adapted to be operated by the lever H, to the outer end of which a rope or chain, H', is affixed, the free end of the rope being led to a convenient point below to be readily reached by the mill attendant.

The belt-tightening device just mentioned is necessary to insure the proper operation of the rotary feed of the log that is being sawed into a continuous board. As the gradual upward movement of the log-carriage that is provided to retain the surface of the log in contact with the gaging-roller $E^2$, and thus cut the board to a regular thickness, has a tendency to loosen the belt $i$ and stop the rotation of the log if a proper provision were not made to insure an automatic tightening of the belt this may most readily be accomplished by affixing a sufficient weight, $H^2$, to the rope or chain H', leading this rope over the bracketed pulley $H^3$. (See Fig. 1.)

In case it is necessary to suddenly arrest the rotary feed motion of the log, this can be accomplished by the pivoted lever J, upon which is supported the box $m$ of the worm-wheel shaft $i'$. The lever J having its pivot at J', is held up to keep the worm-wheel O and worm-cut hub $O^4$ in meshing contact by the latch-bar $J^2$. A disconnecting of the hook of this latch-bar from the lever J will allow the box $m$, shaft $i'$, and worm-wheel O to drop away from the worm-hub $O^4$, thus arresting motion at once.

In the operation of this band-saw mill it is intended to take logs in their rough state, and, after the ends are cut square by a crosscut-saw or other means, the log is centered as near as possible to suit the rough surface, and thus permit this irregular surface to be "trued up" without improper waste of material.

One of the important features of this invention consists in a simple mechanism whereby the log may be gradually fed up to the running band-saw to permit it to cut away knots or rough projections from the body of the log until it has been properly rounded and conforms with its periphery to the centers in which it is suspended. While this truing up or preparatory rounding of the rough log is being effected, the regular feed is thrown out of use by means of the dropping-bar J, and if necessary the lever H of the belt-tightener may be relaxed to slacken the belt $i$. The shaft $u$ may now be rotated by the hand-wheel K, that is affixed to the outer end of this shaft, and thus transmit rotary motion to the chuck-plate $b'$, and through it to the supported log.

In order to hold the log at any proper point of vertical elevation of the log-carriage, a provision has been made that I will now describe. Upon the top surface of the rearward extension of the head-stock $B^2$ a base-plate, M, is secured. It has a slotted guard, M', formed on its rear edge, and through the slot of this guard two bars, $M^2$, are inserted, the outer ends of the bars $M^2$ being pivoted to the plate M. The adjacent edges of the bars $M^2$ are parallel for a portion of their length from the pivoted ends toward the free ends, and these edges are adapted to form a close joint when the outer ends of the bars are clamped together. At a proper point, $s'$, a threaded hole is made through the joined edges of the bars, this hole being so located that a half-nut will be produced in each bar, which will be a complete nut when the bars are held together. The free ends $s''$ of the bars $M^2$ are furnished with hooks to retain the link $m^3$, which latter is of such relative length that its ends which engage the slotted edges of the ends of the bars $M^2$ will clamp these bars together if this oblong ring or link $m^3$ is forcibly driven toward the guard M'. A vertical adjusting-screw, V, is screwed in a foot-plate, V', so that it may be made to engage the threaded hole in the bars $M^2$ when these bars are clamped together and be released when the link $m^3$ is slackened to allow the bars to be somewhat separated. The screw V is provided with a hand-wheel, $V^2$, which is secured on its upper end, and by a rotation of this wheel the log-carriage with a log in position may be adjusted for height as may be desired and held at any point securely.

In Fig. 10 a modified form of the rotary feed for the log is shown. This consists in the use of a rope, U, which is affixed to the grooved edge of the pulley T and given one turn around this pulley, the free end of the rope being carried over the sheave wheel S', that is supported to revolve on the crotched upper end of the standard S, which is erected at a proper point and is of sufficient height to allow a weight, $S^2$, that is attached to the depending end of the rope U, to descend and rotate the log by its downward movement in an obvious manner. The grooved pulley K in this instance performs the function of flanged pulley $u'$ in the former construction—that is to say, it is affixed on shaft $u$, which latter, through bevel gear-wheels $u^3$ and $b^2$, operates the mandrel $b$. Now, in contradistinction to the former construction, in which the shaft $i$ is operated through belt $i'$, in this modified form of construction the pulley K is always held in readiness to turn and actuate the shaft $u$ by means of weight $S^2$ as fast as the saw can cut.

From the foregoing description of this band-saw mill and methods of operation it is apparent that a rough log may be placed in position on the log-carriage and be rapidly cut into a continuous board of any desired thickness, and that the saw-chips may be utilized as an article of commercial value, so that a double purpose is subserved by the device. The boards that are the result of the sawing logs in the manner herein described are of special use for panels or other purposes where extra width of material is needed, and which is thus afforded from a log of ordinary thickness.

Having fully described my invention, what I claim as new, and desire to secure by Letters Patent, is—

1. In a saw-mill, the combination, with a band-saw, of a set of uprights, and a saw-guide extending from one upright to the other, adjustably secured at its ends to said uprights, and adapted to receive and support the saw-blade back of its cutting edge, substantially as set forth.

2. In a saw-mill, the combination, with a band-saw and an elevating log carriage, of a set of uprights, and a saw-guide consisting of a pair of thin parallel plates extending between the uprights and adjustably secured thereto, said guide adapted to receive and support the passing saw-blade back of its cutting-edge, substantially as set forth.

3. In a saw-mill, the combination, with a band-saw and an adjustable guide through which the saw passes, of an elevating log-carriage and a gaging-roller adjustably secured to the mill-frame a distance from the guide relative to the thickness of the board to be cut, substantially as set forth.

4. In a saw-mill, the combination, with a band-saw, pulleys for the band-saw, a driving-shaft upon which one of said pulleys is mounted, and a tension-shaft mounted so as to be moved to tighten the band-saw upon its pulleys, of a log-carriage, an adjustable guide, a gaging-roller, a means of elevating the log-carriage, and means for rotating a log supported on the log-carriage, substantially as set forth.

5. In a saw-mill, the combination, with a band-saw actuated by driving-pulleys, of a log-carriage having a vertical movement, a saw-guide adjustably secured to the frame, and a gage-roller located in close proximity to the guide for gaging the thickness of the board being cut, substantially as set forth.

6. In a saw-mill, the combination, with a log-carriage having a vertical feed movement, of a band-saw, mechanism to rotate a log simultaneously with the upward feed movement of the log-carriage, and a gaging-roller having contact with a log being operated upon, substantially as set forth.

7. In a saw-mill, the combination, with a log-carriage having a vertical feed movement, of a band-saw, a guide for said saw, mechanism to rotate a log simultaneously with the upward feed movement of the log-carriage, and an engaging-roller having contact with a log being cut, substantially as set forth.

8. In a band-saw mill, the combination, with a log-carriage having a vertical feed movement, of a band-saw, mechanism to rotate a log simultaneously with the upward feed movement of the log-carriage, and an adjustable saw-guide adapted to receive the saw and pass with it into the kerf of the log, substantially as set forth.

9. In a saw-mill, the combination, with a band-saw, of an adjustable gaging-roller adapted to regulate the thickness of the board being cut and an elevating log-carriage adapted to maintain a steady feed to the saw, substantially as set forth.

10. In a saw-mill, the combination, with a band-saw, of a guide composed of a top and bottom plate, and a slotted spacing-plate adjustably secured between the top and bottom plates by means of screws or similar devices, substantially as set forth.

11. In a saw-mill, the combination, with a band-saw, of a guide for the saw, said guide being composed of a pair of beveled plates, and a slotted spacing-plate adjustably secured between said beveled plates by means of screws passing through the slots, substantially as set forth.

12. In a saw-mill, the combination, with a frame, a vertically-movable log-carriage, and a pair of clamping-bars pivoted on said carriage, of a screw passing through a threaded hole in the adjacent edges of said bars and thence to the frame, whereby the carriage is raised by the screw, substantially as set forth.

13. In a saw-mill, the combination, with a frame, a vertically-movable log-carriage, a base-plate having a slotted guard formed on its edge, and a pair of clamping-bars pivoted on the base-plate and extending through the slot in the guard, said bars having a threaded hole in their adjacent edges and held together by a sliding link, of a screw passing through said hole in the pivoted bars and adapted to turn therein, thereby elevating or lowering the carriage, substantially as set forth.

14. In a saw-mill, the combination, with a band-saw, pulleys to support the saw, and a driving-shaft to move the saw, of a log-carriage, head and tail stocks on the log-carriage, a mandrel journaled in the head-stock, a shaft geared with said mandrel, a fixed hand-wheel on the end of this shaft to rotate it, and an adjusting-screw extending through the log-carriage and into the frame and adapted to regulate the height and support in position the log-carriage, substantially as set forth.

15. In a saw-mill, the combination, with a frame, an elevating log-carriage, pulleys on the frame, a drive-shaft connected with one of the pulleys, and a band-saw carried on the pulleys, of a secondary shaft, $p$, in position to be driven by a belt from the main drive-shaft, a cone-shaft geared with shaft $p$, a second cone-shaft receiving motion therefrom, the latter having a worm thereon, a transversely-located shaft receiving motion from said worm, a shaft below said transverse shaft receiving motion from the latter, a mandrel journaled in the log-carriage receiving motion from said lower shaft, and a shifting-belt on the cone-shafts, whereby the motion to the mandrel is regulated, substantially as set forth.

In testimony whereof I have signed this specification in the presence of two subscribing witnesses.

EARL W. AVERY.

Witnesses:
EUGENE A. SUNDERLIN,
MARTIN N. HINE.